(12) United States Patent
Ozawa

(10) Patent No.: US 8,977,459 B2
(45) Date of Patent: *Mar. 10, 2015

(54) DRIVE FORCE DISTRIBUTION CONTROL APPARATUS FOR FOUR-WHEEL DRIVE VEHICLE

(75) Inventor: Yuuki Ozawa, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 439 days.

This patent is subject to a terminal disclaimer.

(21) Appl. No.: 13/393,793

(22) PCT Filed: Jul. 5, 2011

(86) PCT No.: PCT/JP2011/065390
§ 371 (c)(1),
(2), (4) Date: Mar. 1, 2012

(87) PCT Pub. No.: WO2012/005256
PCT Pub. Date: Jan. 12, 2012

(65) Prior Publication Data
US 2012/0166055 A1 Jun. 28, 2012

(30) Foreign Application Priority Data
Jul. 9, 2010 (JP) .................................. 2010-156664

(51) Int. Cl.
*B60K 17/348* (2006.01)
*B60K 23/04* (2006.01)
*B60K 23/08* (2006.01)
*B60K 17/02* (2006.01)

(52) U.S. Cl.
CPC ......... *B60K 17/348* (2013.01); *B60K 2023/043* (2013.01); *B60K 23/08* (2013.01); *B60K 17/02* (2013.01)
USPC .......................................................... 701/69

(58) Field of Classification Search
CPC ................. B60K 17/02; B60K 17/348; B60K 2023/043; B60K 23/08; B60K 23/04
USPC .......................................................... 701/69
See application file for complete search history.

(56) References Cited

FOREIGN PATENT DOCUMENTS

| JP | 03-189241 | 8/1991 |
| JP | 05-238280 | 9/1993 |

(Continued)

OTHER PUBLICATIONS

International Search Report of PCT/JP2011/065390.

(Continued)

*Primary Examiner* — Helal A Algahaim
*Assistant Examiner* — Charles J Han
(74) *Attorney, Agent, or Firm* — Global IP Counselors, LLP

(57) ABSTRACT

When a rear wheel total drive force is smaller than a rear wheel drive force difference and the rear wheel drive force difference cannot be realized by setting a left-right distribution of the rear wheel total drive force, an inside wheel target drive force is set unconditionally to a minimum initial drive force required to prevent a three-wheel drive state and an outside wheel target drive force is set to a value equal to the sum of the initial drive force and the rear wheel drive force difference, which is a value with which the rear wheel drive force difference can be realized while the inside wheel target drive force is set to the initial drive force. In this way, a drive force distribution control apparatus gives priority to realizing the rear wheel drive force difference and emphasizes achieving a target behavior over achieving a four-wheel drive performance.

6 Claims, 8 Drawing Sheets

(56) References Cited

FOREIGN PATENT DOCUMENTS

| JP | 07-164911 | 6/1995 |
| JP | 07-228169 | 8/1995 |
| JP | 2005-289160 | 10/2005 |
| JP | 2007-185989 | 7/2007 |

OTHER PUBLICATIONS

Extended European Search Report for the corresponding European patent application No. 11803590.6 issued on Jun. 18, 2014.

DRIVE FORCE DISTRIBUTION CONTROL APPARATUS FOR FOUR-WHEEL DRIVE VEHICLE

CROSS-REFERENCE TO RELATED APPLICATIONS

This application is a U.S. National stage application of International Application No. PCT/JP2011/065390, filed Jul. 5, 2011, which claims priority claims priority under 35 U.S.C. §119(a) to Japanese Patent Application No. 2010-156664, filed in Japan on Jul. 9, 2010, the entire contents of which is hereby incorporated by reference.

BACKGROUND OF THE INVENTION

1. Field of the Invention

The present invention generally relates to a four-wheel drive vehicle that can transmit a portion of a drive force headed toward a main drive wheel to a subordinate drive wheel and distribute the portion of the drive force to a left subordinate drive wheel and a right subordinate drive wheel. More particularly, the present invention relates to a four-wheel drive vehicle drive force distribution control apparatus that controls a total drive force distributed to the left and right subordinate drive wheels and a drive force difference between the left and right subordinate drive wheels.

2. Background Information

An example of a conventional proposal for such a four-wheel drive vehicle and a drive force distribution control technology for such a vehicle is disclosed in Japanese Laid-Open Patent Publication No. 2007-185959 (See, FIGS. 1 and 5). The proposed technology has a total drive force control device and a left-right drive force difference control device to control a total drive force distributed to the left and right subordinate drive wheels and a drive force difference between the left and right subordinate drive wheels. In order to control the total drive force and the drive force difference, a target front-rear drive force distribution ratio between the main drive wheels and the subordinate drive wheels and a target left-right drive force distribution ratio between the left and right subordinate drive wheels are calculated. Then, the total drive force control device is operated such that the target front-rear drive force distribution ratio is achieved and the left-right drive force difference control device is operated such that the target left-right drive force distribution ratio is achieved.

SUMMARY

Since this conventional four-wheel drive vehicle drive force distribution control is a drive force distribution ratio realization control that controls a front-rear drive force distribution ratio and a left-right drive force distribution ratio to the aforementioned target distribution ratios, the control first sets a total drive force to be distributed to the left and right subordinate drive wheels to a value corresponding to the target front-rear drive force distribution ratio and then sets drive forces of the left and right subordinate drive wheels to values corresponding to the target left-right drive force distribution ratio such that the sum of the drive forces of the left and right subordinate drive wheels does not exceed the size of the set total drive force.

Consequently, the difference between the drive forces of the left and right subordinate drive wheels will not exceed the total drive force delivered to the left and right subordinate drive wheels. In other words, the total drive force delivered to the left and right subordinate drive wheels is 100 N-m, then the maximum realizable difference between the drive forces of the left and right subordinate drive wheels is 100 N-m. Thus, if a left-right drive force difference larger than 100 N-m is necessary, then the necessary left-right drive force difference cannot be realized.

The behavior of the vehicle is determined according to the left-right drive force difference. If a steering operation performed by a driver requests a sharp turn behavior of the vehicle and a left-right drive force difference of, for example, 110 N-m is necessary to execute the sharp turn, then it will not be possible to achieve a corresponding turning performance because a drive force difference of 100 N-m is all that can be actually set between the left and right subordinate drive wheels. Consequently, a problem exists in that a sharp turn in accordance with the request issued by the steering operation performed by the driver cannot be realized.

An object of the present invention is to propose a four-wheel drive vehicle drive force distribution control apparatus that can reliably achieve the requested drive force difference between the left and right subordinate drive wheels is a situation like that explained above, thereby resolving the aforementioned problem.

Constituent features adopted in a four-wheel drive vehicle drive force distribution control apparatus will now be briefly explained. The four-wheel drive vehicle drive force distribution control apparatus is used with a four-wheel drive vehicle that has a left subordinate drive wheel friction element and a right subordinate drive wheel friction element installed in a drive train that transmits a portion of a drive force heading toward a main drive wheel to a subordinate drive wheel. The left and right subordinate drive wheel friction elements can control the drive forces delivered to the left subordinate drive wheel and the right subordinate drive wheel individually. By controlling the holding forces of the left subordinate drive wheel friction element and the right subordinate drive wheel friction element, the apparatus executes control of a drive force distribution between the main drive wheel and the subordinate drive wheel and control of a drive force distribution between the left subordinate drive wheel and the right subordinate drive wheel.

The four-wheel drive vehicle drive force distribution control apparatus has a target value setting section and a friction element holding force control section. The target value setting section serves to, based on a vehicle operating state, set a target value of a total drive force to be delivered to the left subordinate drive wheel and the right subordinate drive wheel and a target value of a left-right drive force difference between the drive forces of the left subordinate drive wheel and the right subordinate drive wheel. The friction element holding force control section controls the holding forces of the left subordinate drive wheel friction element and the right subordinate drive wheel friction element such that the total drive force matches the target value for the total drive force set by the target value setting section and the left-right drive force difference matches the target value for the left-right drive force difference set by the target value setting section.

With a four-wheel drive vehicle drive force distribution control apparatus, the friction element holding force control section controls the holding forces of the left subordinate drive wheel friction element and the right subordinate drive wheel friction element such that the total drive force matches the target value for the total drive force set by the target value setting section and the left-right drive force difference matches the target value for the left-right drive force difference set by the target value setting section. As a result, the target value of the left-right drive force difference can be realized in a reliable fashion and a vehicle turning behavior in accordance with the target value of the left-right drive force difference, i.e., in accordance with a driver's request, can be obtained.

BRIEF DESCRIPTION OF THE DRAWINGS

Referring now to the attached drawings which form a part of this original disclosure.

DESCRIPTIONS OF THE REFERENCE SYMBOLS

Figure 1:
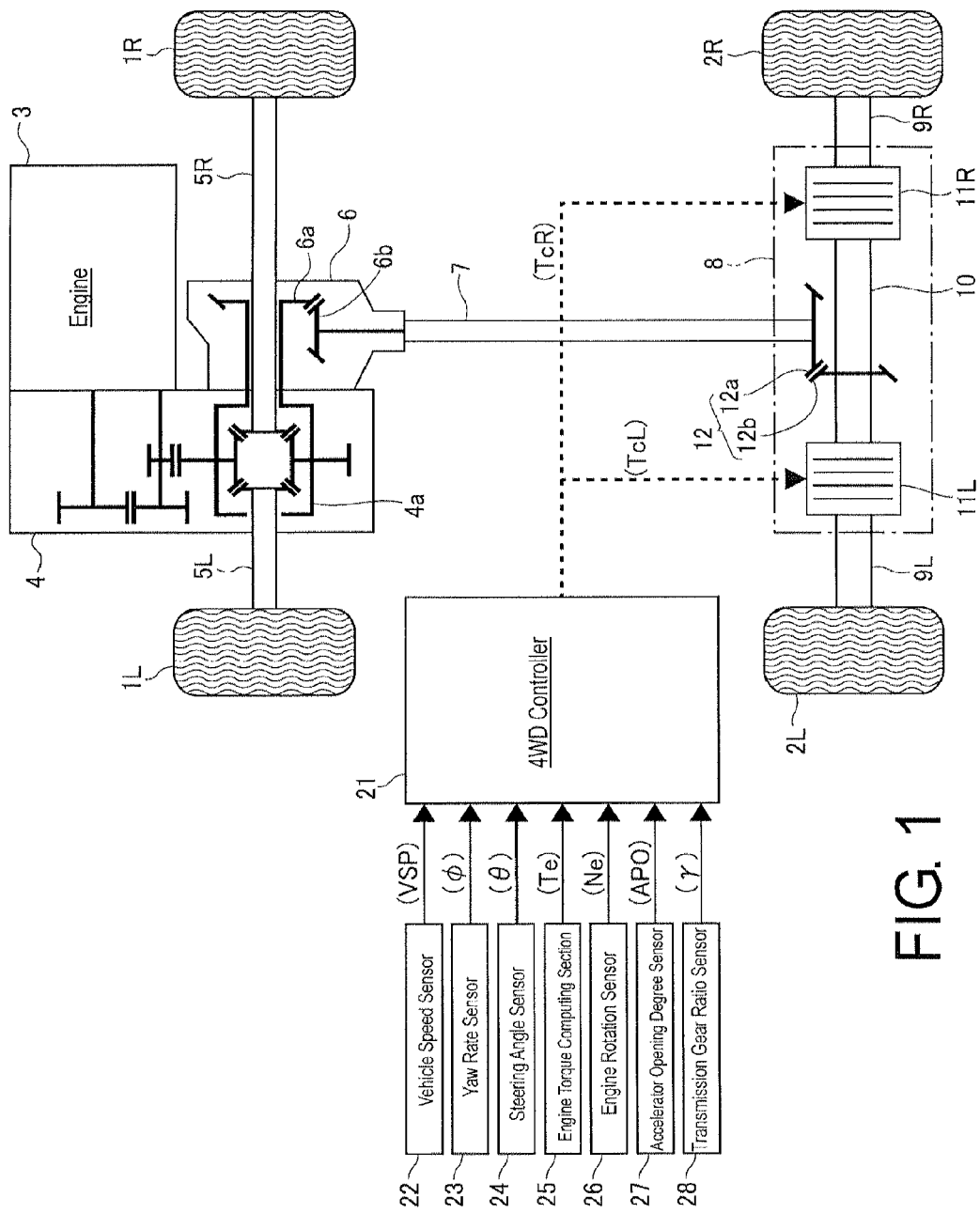
FIG. 1 is a schematic plan view showing a wheel drive train of a four-wheel drive vehicle equipped with a drive force distribution control apparatus according to one embodiment of as viewed from above the vehicle, and a four-wheel drive control system is also shown.

Reference symbols 1L, 1R refer to left and right front wheels (left and right main drive wheels), reference symbols 2L, 2R refer to left and right rear wheels (left and right subordinate drive wheels), reference symbol 3 refers to engine, reference symbol 4 refers to transmission (transaxle), reference symbols 5L, 5R refer to left and right front wheel axle shafts, reference symbol 6 refers to transfer case, reference symbol 7 refers to propeller shaft, reference symbol 8 refers to left and right rear wheel drive force distributing unit, reference symbols 9L, 9R refer to left and right rear wheel axle shafts, reference symbol 10 refers to center shaft, reference symbol 11L refers to left rear wheel clutch (left subordinate drive wheel clutch), reference symbol 11R refers to right rear wheel clutch (right subordinate drive wheel clutch), reference symbol 12 refers to final reduction gear, reference symbol 21 refers to four-wheel drive controller, reference symbol 22 refers to vehicle speed sensor, reference symbol 23 refers to yaw rate sensor, reference symbol 24 refers to steering angle sensor, reference symbol 25 refers to engine torque computing section, reference symbol 26 refers to engine rotation sensor, reference symbol 27 refers to accelerator opening degree sensor, reference symbol 28 refers to transmission gear ratio sensor, reference symbol 31 refer to input signal processing section, reference symbol 32 refers to rear wheel total drive force computing section, reference symbol 33 refers to left-right rear wheel drive force difference computing section, and reference symbol 34 refers to left-right rear wheel target drive force computing section).

DETAILED DESCRIPTION OF THE EMBODIMENTS

It will be apparent to those skilled in the art from this disclosure that the following descriptions of the embodiments are provided for illustration only and not for the purpose of limiting the invention as defined by the appended claims and their equivalents. One illustrative embodiment will now be explained in detail with reference to the drawings. FIG. 1 is a schematic plan view showing a wheel drive train of a four-wheel drive vehicle equipped with a drive force distribution control apparatus according to an embodiment of the present invention as viewed from above the vehicle. A four-wheel drive control system is also shown. In the figure, e left and right front wheels 1L and 1R serves as main drive wheels and the left and right rear wheels 2L and 2R serves as subordinate drive wheels. In this patent specification, the term "drive force" does not refer to power but, instead, refers to a torque value.

An engine 3 serves as a prime mover for the four-wheel drive vehicle. Torque from the engine 3 is multiplied by a gear ratio at the transmission 4 (transaxle that includes a differential gear device 4a) and transferred toward the left and right front wheels 1L and 1R through left and right axle shafts 5L and 5R, thereby serving to drive the left and right front wheels 1L and 1R.

A portion of the drive force exiting the transmission 4 and heading toward the left and right front wheels 1L and 1R is redirected toward the left and right rear wheels 2L and 2R by a transfer case 6. A drive train used to accomplish this redirection will now be explained.

The transfer case 6 has a bevel gear set comprising an input hypoid gear 6a and an output hypoid gear 6b. The input hypoid gear 6a is connected to a differential gear case serving as an input rotary member of the differential gear device 4a such that the input hypoid gear 6a rotates together with the differential gear case. The output hypoid gear 6b is connected to a front end of a propeller shaft 7, and the propeller shaft 7 is arranged to extend rearward toward a left-right rear wheel drive force distributing unit 8.

The transfer case 6 sets a gear ratio of the bevel gear set comprising the hypoid gear 6a and the output hypoid gear 6b such that a portion of a drive force heading toward the left and right front wheels 1L and 1R is converted to a higher rotational speed and outputted toward the propeller shaft 7.

The faster rotation outputted to the propeller shaft 7 is distributed to the left and right rear wheels 2L and 2R by the left-right rear wheel drive force distributing unit 8 in accordance with a control explained later. The left-right rear wheel drive force distributing unit 8 has a center shaft 10 that is arranged between an axle shaft 9L and an axle shaft 9R of the left and right rear wheels 2L and 2R and extends along an axial direction of the axle shafts 9L and 9R. The left-right rear wheel drive force distributing unit 8 also has a left rear wheel clutch (left subordinate drive wheel friction element) 11L and a right rear wheel clutch (right subordinate drive wheel friction element) 11R. The left rear wheel clutch 11L is arranged between the center shaft 10 and the left rear wheel axle shaft 9L and serves to control a connection between the shafts 10 and 9L. The right rear wheel clutch 11R is arranged between the center shaft 10 and the right rear wheel axle shaft 9R and serves to control a connection between the shafts 10 and 9R.

A bevel gear type final reduction gear 12 is drivably connected between the center shaft 10 and a rearward end of the propeller shaft 7 extending rearward from the transfer case 6. The final reduction gear 12 comprises an input hypoid gear 12a and an output hypoid gear 12b.

The reduction gear ratio of the final reduction gear 12 is set in relation to the speed-increasing gear ratio of the transfer case 6 (speed increasing gear ratio resulting from the bevel gear set comprising the hypoid gear 6a and the output hypoid gear 6b) to such a gear ratio that the portion of the drive force heading toward the left and right front wheels 1L and 1R that is redirected toward the center shaft 10 is delivered to the center shaft 10 with an increased rotational speed. In this embodiment, a total gear ratio of the transfer case 6 and the final reduction gear 12 is set such that a rotational speed of the center shaft 10 is increased with respect to the left and right front wheels 1L and 1R.

The reason for setting the total gear ratio of the transfer case 6 and the final reduction gear 12 in this way will now be explained. If the rotational speed of the center shaft 10 is not increased, then whichever of the left and right rear wheels 2L and 2R is the outside rear wheel 2L (or 2R) during the turn will rotate at a higher rotational speed than the center shaft 10. Under such conditions, if the clutch 11L (or 11R) corresponding to the rear wheel 2L (or 2R) located on the outside of the turn is engaged, then the high rotational speed of that rear wheel will be dragged down by the more slowly rotating center shaft 10 until the rotational speed decreases to the rotational speed of the center shaft 10. Consequently, the center shaft 10 will not be able to transmit a drive force to the rear wheel 2L (or 2R) located on the outside of the turn and it will not be possible to achieve the intended drive force distribution control. As a result, the four-wheel drive control will not function properly.

Therefore, in order to ensure that during a turn the rotational speed of the center shaft 10 does not fall below the rotational speed of the rear wheel 2L (or 2R) located on the outside of the turn and cause the drive force distribution control to be ineffective, the total gear ratio of the transfer case 6 and the final reduction gear 12 is set as explained previously. Also the center shaft 10 is rotated at an increased rotational speed as explained previously. By rotating the center shaft 10 at an increased rotational speed, the drive force distribution control explained later can be accomplished as intended.

In the wheel drive train of the four-wheel drive vehicle explained above, torque from the engine 3 is multiplied by a gear ratio at the transmission (transaxle) 4 and transferred to the left and right front wheels 1L and 1R, thus driving the left and right front wheels 1L and 1R.

While this is occurring, a portion of the drive force heading toward the left and right front wheels 1L and 1R is transferred successively from the transfer case 6 to the propeller shaft 7, to the final reduction gear 12, to the center shaft 10, to the clutches 11L and 11R, and to the left and right wheels 2L and 2R. The reduction gear 12 increases the speed of the rotation transferred to the center shaft 10, and the holding forces of the clutches 11L and 11R are controlled such that the clutches 11L and 11R slip in accordance with the amount of speed increase. Thus, with the left and right front wheels 1L and 1R and the left and right rear wheels 2L and 2R driven in this way, the vehicle can be operated in four-wheel drive.

In this four-wheel drive vehicle, it is necessary to control the holding forces of the left rear wheel clutch 11L and the right rear wheel clutch 11R. Additionally, in order to improve the performance of this four-wheel drive vehicle when starting into motion from a stopped condition and when accelerating, the vehicle is configured such that a front-rear wheel drive force distribution control can be executed by controlling a total holding force of the left wheel clutch 11L and the right wheel clutch 11R. In order to improve a turning performance of the vehicle and execute a behavior control such that an actual behavior (actual yaw rate, etc.) of the vehicle matches a target based on an operating state and traveling conditions of the vehicle, the vehicle is configured a left-right wheel drive force distribution control is executed by controlling the holding forces of the left rear wheel clutch 11L and the right rear wheel clutch 11R.

Therefore, a holding force control system of the left rear wheel clutch 11L and the right rear wheel clutch 11R is configured as will now be explained. Each of the left rear wheel clutch 11L and the right rear wheel clutch 11R is an electromagnetic clutch in which the holding force is determined based on a supplied current. A four-wheel drive (4WD) controller 21 accomplishes the aforementioned front-rear wheel drive force distribution control and left-right wheel drive force distribution control by electronically controlling electric currents supplied to the clutches 11L and 11R such that the holding forces of the clutches 11L and 11R correspond to target drive forces TcL and TcR of the left and right rear wheels 2L and 2R, respectively.

In order to compute a target drive force TcL of the left wheel 2L and a target drive force TcR of the right wheel, the four-wheel drive controller 21 receives the following input signals: a signal from a vehicle speed sensor 22 that detects a vehicle speed VSP, a signal from a yaw rate sensor 23 that detects a yaw rate □ about a vertical axis passing through a center of gravity of the vehicle, a signal from a steering sensor 24 that detects a steering wheel steering angle θ, a signal from an engine torque computing section 25 that computes an output torque Te of the engine 3, a signal from an engine rotation sensor 26 that detects an engine rotational speed Ne, a signal from an accelerator opening degree sensor 27 that detects an accelerator opening degree APO as an accelerator pedal depression amount, and a signal from a transmission gear ratio sensor 28 that detects a currently selected gear ratio γ of the transmission 4.

Based on the input information just explained, the four-wheel drive controller 21 computes a left rear wheel target drive force TcL and a right rear wheel target drive TcR to be used for the front-rear wheel drive force distribution control and the left-right wheel drive force distribution control and electronically controls the holding forces (electric currents) of the left rear wheel clutch 11L and the right rear wheel clutch 11R such that the rive forces of the left and right rear wheels 2L and 2R match the target drive forces TcL and TcR.

The front-rear wheel drive force distribution control and the left-right wheel drive force distribution control executed by the four-wheel drive controller 21, i.e., the method of setting the left rear wheel target drive force TcL and the right rear wheel target drive force TcR, will now be explained.

Figure 2:
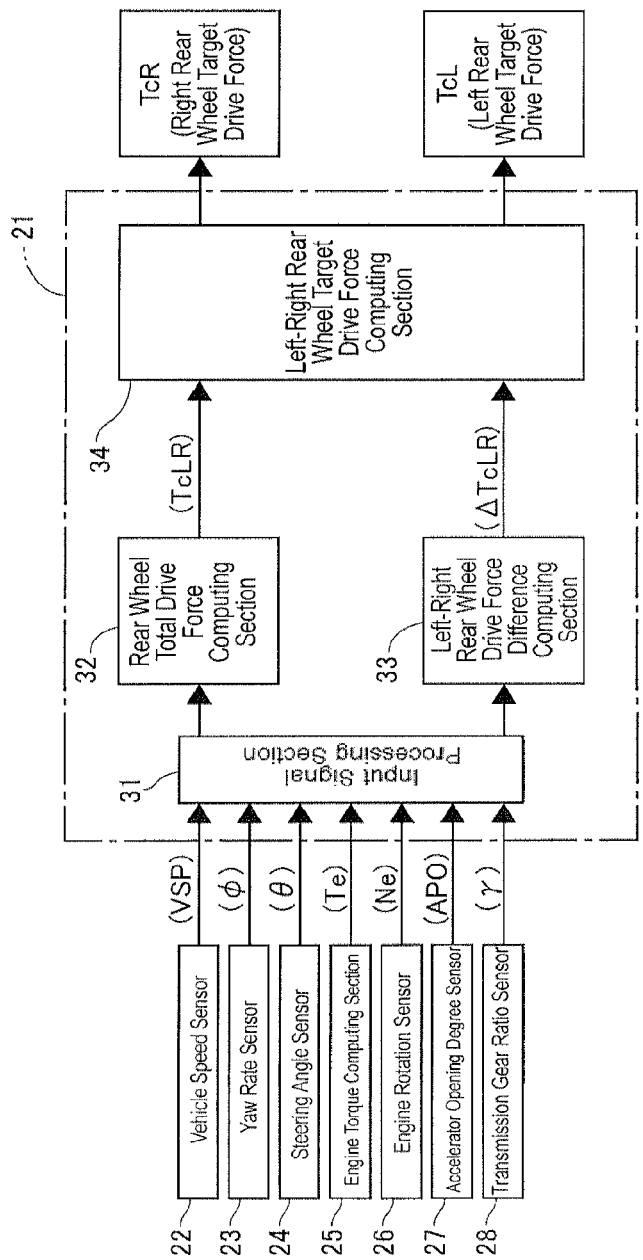
FIG. 2 is a function-specific block diagram of the four-wheel drive controller shown in FIG. 1.

As shown in function-specific block diagram of FIG. 2, the four-wheel drive controller 21 comprises an input signal processing section 31, a rear wheel total drive force computing section 32, a left-right rear wheel drive force difference computing section 33, and a left-right rear wheel target drive force computing section 34. The rear wheel total drive force computing section 32 and the left-right rear wheel drive force computing section 33 together constitute a target value setting section. The left-right rear wheel target drive force computing section 34 constitute a friction element holding force control section.

The input signal processing section 31 serves to remove noise from detection signals of the vehicle speed sensor 22, the yaw rate sensor 23, the steering angle sensor 24, the engine torque computing section 25, the engine rotation sensor 26, the accelerator opening degree sensor 27, and the transmission gear ratio sensor 28 so that the signals can be used in the computations that will be now be explained.

An example of how the rear wheel total drive force computing section 32 computes a total drive force target value TcLR (hereinafter called "total drive force TcLR") for the left and right rear wheels 2L and 2R will now be explained. First, the computing section 32 computes an input torque Ti to the differential gear device 4a based on an engine torque Te and the transmission gear ratio γ. Next, the computing section 32 calculates left-right front wheel average speed and a left-right rear wheel average speed based on signals from the vehicle speed sensor and determines a degree of drive slippage (front rear wheel rotational speed difference) of the left and right front wheels 1L and 1R estimated by comparing the two average speeds. The computing section 32 also determines how much of the input torque Ti to direct toward the left and right rear wheels 2L and 2R in accordance with the accelerator opening degree APO and sets that amount as a total drive force TcLR to be directed to the rear wheels.

The larger the drive slippage (front-rear wheel rotational speed difference) of the left and right front wheels 1L and 1R is, the larger the total drive force TcLR to be directed to the rear wheels needs to be in order to suppress the slippage. Meanwhile, the larger the accelerator opening degree APO is, the larger the drive force requested by the driver is and the larger the total drive force TLR directed to the rear wheels needs to be in order to satisfy the request.

An example of how the left-right rear wheel drive force difference computing section 33 computes a drive force difference target value ΔTcLR (hereinafter called "drive force difference ΔTcLR") between the left and right rear wheels 2L and 2R will now be explained. First, a left-right rear wheel drive force difference steady control amount cΔTcLR (not shown in the drawings) required to achieve a vehicle turning behavior requested by a driver in a steady manner is computed as will now be explained. The computing section 33 estimates a longitudinal acceleration rate Gx of the vehicle based on the engine torque Te and the transmission gear ratio γ and a lateral acceleration rate Gy of the vehicle based on a steering angle θ and a vehicle speed VSP. An under-steering state (state in which an actual turning behavior is insufficient in relation to a target turning behavior) can be ascertained based on a combination of the estimated longitudinal acceleration rate Gx and the lateral acceleration rate Gy. The computing section 33 determines a left-right rear wheel drive force difference necessary to resolve the under-steering state as a left-right rear wheel drive force steady-state control amount cΔTcLR (not shown in the drawings). The reason estimated values of the longitudinal acceleration rate Gx and the lateral acceleration rate Gy are used instead of detected values is that the left-right rear wheel drive force difference computing section 33 is a feed forward control system and an estimated value matches the actual state of the control better than a detected value, which is a result value.

Thus, while the steering angle θ is near 0 (while the wheels are not being turned), the left-right rear wheel drive force difference steady-state control amount cΔTcLR (not shown) is held at 0 because the lateral acceleration rate Gy equals 0. Conversely, while the steering angle θ is not near 0 (while the wheels are being turned), the lateral acceleration rate Gy increases as the steering angle θ and the vehicle speed VSP increase and there is a strong tendency for the vehicle to experience under-steering. Consequently, the left-right rear wheel drive force difference steady-state control amount cΔTcLR (not shown) increases. Furthermore, as the longitudinal acceleration rate Gx increases, the tendency for the vehicle to experience under-steering strengthens and the left-right rear wheel drive force difference steady-state control amount cΔTcLR (not shown) increases.

Meanwhile, the left-right rear wheel drive force difference computing section 33 calculates a left-right rear wheel drive force difference excessive control amount dΔTcLR (not shown) for responding to an excessive turn request in which a driver changes the steering angle θ at an excessive rate. That is, based on the steering angle θ and the vehicle speed VSP, the computing section 33 computes a target yaw rate desired by the driver. The higher a change rate of the target yaw rate is, the higher the desired turning response is and, accordingly, the larger the value to which the left-right rear wheel drive force difference excessive control amount dΔTcLR (now shown) is set. The reason a target yaw rate is used instead of a yaw rate detection value Φ is that the left-right rear wheel drive force difference computing section 33 is a feed forward control system and a target yaw rate (which is an estimated value) matches the actual state of the control better than a detected value (which is a result value).

The left-right rear wheel drive force difference computing section 33 calculates a sum of the left-right rear wheel drive force difference steady-state control amount cΔTcLR computed as explained earlier and the left-right rear wheel drive force difference excessive control amount dΔTcLR computed as explained earlier and sets the sum as a left-right rear wheel drive force difference Δ TcLR to be targeted during a vehicle turning behavior.

However, the actual turning behavior (actual yaw rate Φ) the vehicle exhibits when the left-right rear wheel drive force difference ΔTcLR is applied sometimes does not match the target turning behavior (target yaw rate tΦ) requested through a steering operation performed by a driver due to a side wind or other external disturbance. The left-right rear wheel drive force difference computing section 33 also executes a feedback control in accordance with a difference between a target turning behavior (target yaw rate tΦ) and an actual turning behavior (actual yaw rate Φ) and thereby revises the left-right rear wheel drive force difference ΔTcLR such that the actual turning behavior (actual yaw rate Φ) matches the target turning behavior (target yaw rate tΦ).

A mismatch between the actual turning behavior (actual yaw rate Φ) and the target turning behavior (target yaw rate tΦ) can also be resolved by increasing and decreasing the left-right rear wheel total drive force TcLR. The vehicle behavior tends toward over steering when the left-right rear wheel total drive force TcLR is increased and toward under steering when the left-right rear wheel total drive force TcLR is decreased. When the actual turning behavior (actual yaw rate Φ) is insufficient with respect to the target turning behavior (target yaw rate t Φ), the insufficiency can be resolved by increasing the left-right rear wheel total drive force TcLR. Conversely, when the actual turning behavior (actual yaw rate Φ) is excessive with respect to the target turning behavior (target yaw rate t Φ), the excessiveness can be resolved by decreasing the left-right rear wheel total drive force TcLR.

Therefore, the rear wheel total drive force computing section 32 also executes a feedback control in accordance with a difference between a target turning behavior (target yaw rate tΦ) and an actual turning behavior (actual yaw rate Φ) and thereby revises the left-right rear wheel total drive force TcLR such that the actual turning behavior (actual yaw rate Φ) matches the target turning behavior (target yaw rate tΦ).

With the process shown in FIGS. 3 and 4, the left-right rear wheel target drive force computing section 34 calculates a left rear wheel target drive force TcL and a right rear wheel target drive force TcR that satisfy a limit condition explained later while also satisfying both the left-right rear wheel total drive force TcLR and the left-right rear wheel drive force difference ΔTcLR as nearly as possible.

Figure 3:
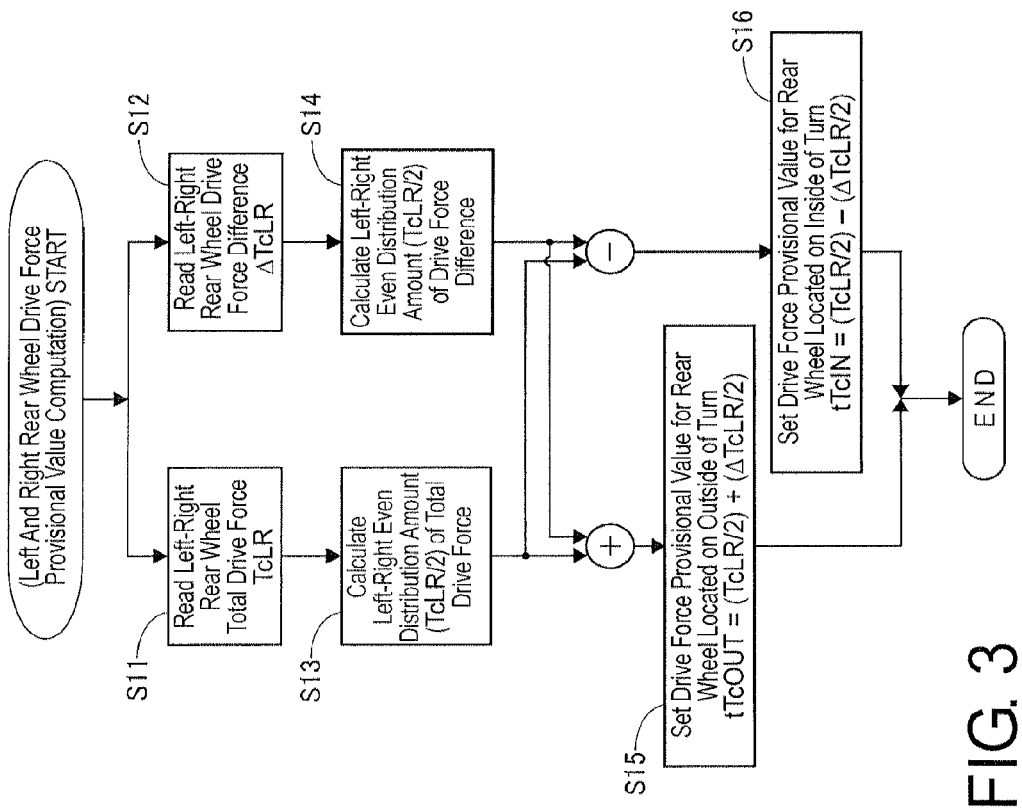
FIG. 3 is a flowchart showing a process by which the left-right rear wheel target drive force computing section, which is shown in FIG. 2, computes left and right rear wheel drive force provisional values.

FIG. 3 shows a process executed to set drive force provisional values of the left and right rear wheels (rear wheels located on the inside and outside of turn) to be used when calculating the left rear wheel target drive force TcL and the right rear wheel target drive force TcR. In step S11, computing section 34 reads a rear wheel total drive force TcLR calculated by the computing section 32 as explained previously, and in step S12 the computing section 34 reads a left-right rear wheel drive force difference ΔTcLR calculated by the computing section 33 as explained previously.

In step S13, the computing section 34 calculates a left-right even distribution amount TcLR/2 of the rear wheel total drive force TcLR. In step S14, the computing section 34 calculates a left-right even distribution amount ΔTcLR/2 of the rear wheel drive force difference ΔTcLR. In step S15, the computing section 34 adds the rear wheel drive force difference left-right even distribution amount ΔTcLR/2 to the rear wheel total drive force left-right even distribution amount TcLR/2 to obtain a drive force provisional value tTcOUT for the rear wheel on the outside of the turn (tTcOUT=TcLR/2+ΔTcLR/2). In step S16, the computing section 34 subtracts the rear wheel drive force difference left-right even distribution amount ΔTcLR/2 from the rear wheel total drive force left-right even distribution amount TcLR/2 to obtain a drive force provisional value tTcIN for the rear wheel on the inside of the turn (tTcIN=TcLR/2−ΔTcLR/2).

Thus calculated, the drive force provisional value tTcOUT of the rear wheel on the outside of the turn and the drive force provisional value tTcIN of the rear wheel on the inside of the turn are a drive force of the rear wheel on the outside of the turn and a drive force of the rear wheel on the inside of the turn for achieving both the rear wheel total drive force TcLR and the rear wheel drive force difference ΔTcLR when the rear wheel total drive force TcLR is equal to or larger than the rear wheel drive force difference ΔTcLR, i.e., when the rear wheel drive force difference ΔTcLR can be realized by setting a left-right distribution of the rear wheel total drive force TcLR.

Figure 4:
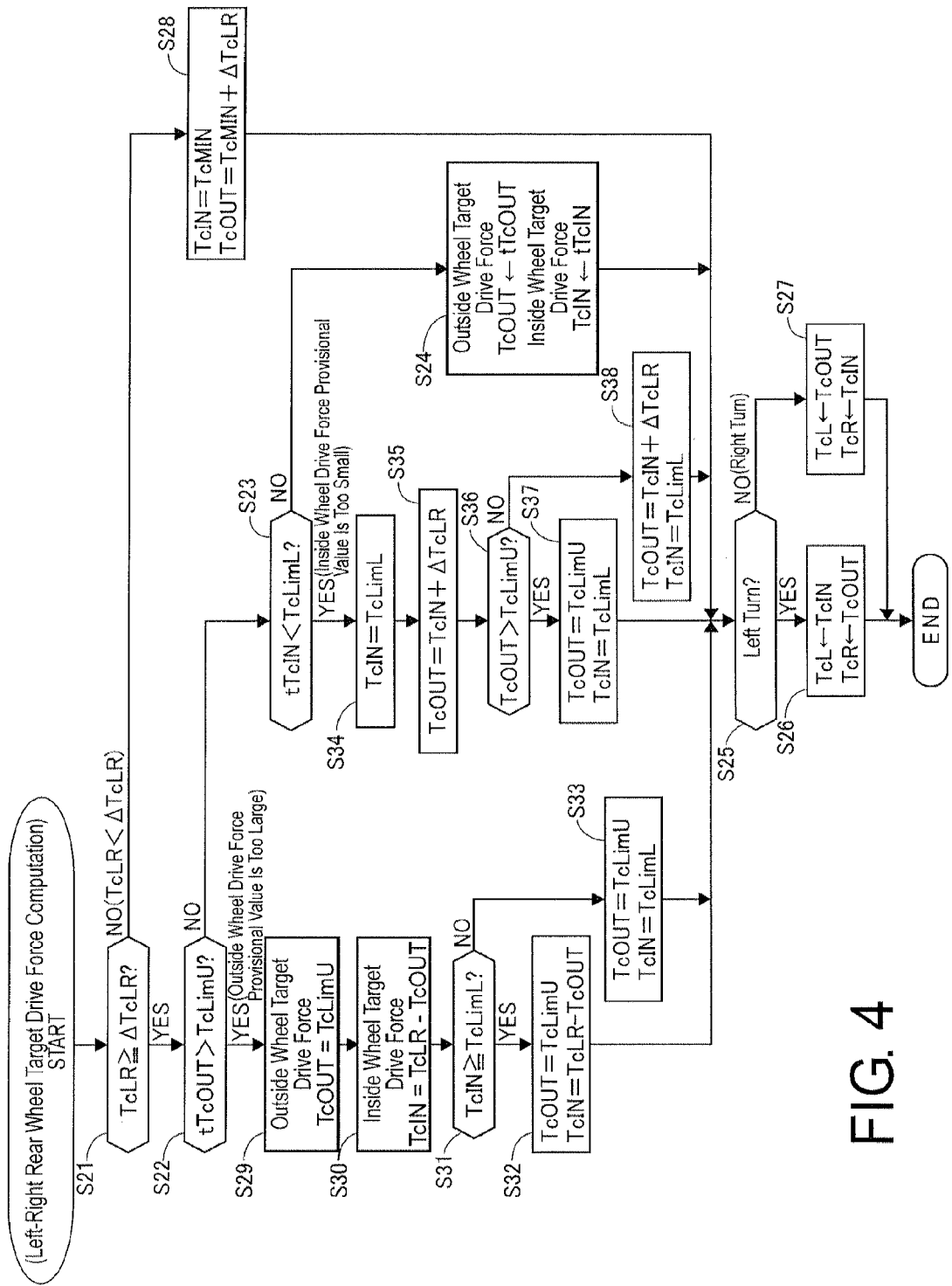
FIG. 4 is a flowchart showing a process by which the left-right rear wheel target drive force computing section, which is shown in FIG. 2, computes left and right rear wheel target drive forces.

FIG. 4 shows a process executed to set the left rear wheel target drive force TcL and the right rear wheel target drive force TcR based on the outside drive force provisional value tTcOUT of the rear wheel on the outside of the turn and the inside drive force provisional value tTcIN of the rear wheel on the inside of the turn. In step S21, the computing section 34 checks if the rear wheel total drive force TcLR is equal to or larger than the rear wheel drive force difference ΔTcLR, i.e., if it is possible to realize the rear wheel drive force difference ΔTcLR by setting a left-right distribution of the rear wheel total drive force TcLR. Thus, step S21 corresponds to a drive force comparing section.

If it determines in step S21 that TcLR≥ΔTcLR, then the computing section 34 proceeds to step S22 and determines if the larger outside drive force provisional value tTcOUT exceeds an allowable upper limit value TcLimU determined based on, for example, a maximum realizable clutch holding capacity. If not, then the computing section 34 proceeds to step S23 and determines if the inside drive force provisional value tTcIN (the smaller provisional value) is smaller than an allowable lower limit value TcLimL set, for example, for preventing an unstable three-wheel drive state in which the inside rear wheel drive force=0.

If the computing section 34 determines that tTcOUT is not larger than TcLimU in step S22 and that tTcIN is not smaller then TcLimL in step S23, then neither the outside wheel drive force provisional value tTcOUT nor the inside drive force provisional value tTcIN is at a limit value. Therefore, in step S24, the computing section 34 sets the outside drive force provisional value tTcOUT as the outside wheel target drive force TcOUT and the inside wheel drive force provisional value tTcIN as the inside target drive force TcIN without modification.

The processing steps executed until the outside wheel target drive force TcOUT and the inside wheel target drive force TcIN are set in step S24 as explained above will now be explained with reference to FIG. 5. Portion (a) of FIG. 5 shows the levels of the rear wheel total drive force TcLR and the rear wheel drive force difference ΔTcLR read in steps S11 and S12 of FIG. 3, and portion (b) of FIG. 5 shows the left-right even distribution amount TcLR/2 of the rear wheel total drive force TcLR (step S13).

Figure 5:
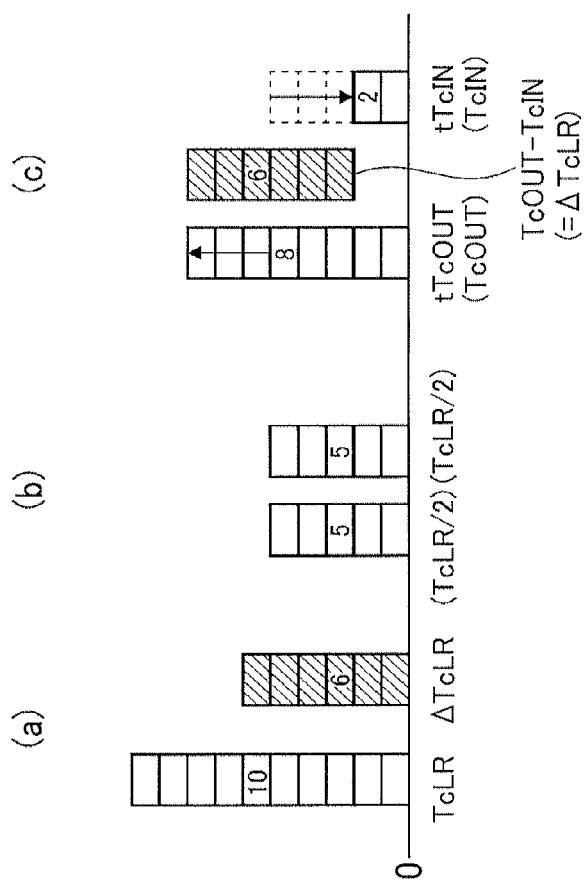
FIG. 5 illustrates how an outside wheel target drive force TcOUT and an inside wheel target drive force TcIN are determined before the left-right rear wheel target drive force computing section, which is shown in FIG. 2, computes left and right rear wheel target drive forces in a situation where a rear wheel total drive force TcLR is larger than a rear wheel drive force difference ΔTcLR and neither an outside wheel drive force provisional value tTcOUT nor an inside wheel drive force provisional value tTcIN is at a limit value, in which portion (a) shows levels of a rear wheel total drive force TcLR and a rear wheel drive force difference ΔTcLR to be targeted, portion (b) shows a left-right even distribution amount TcLR/2 for the rear wheel total drive force TcLR, and (portion c) shows the outside wheel drive force provisional value tTcOUT (outside wheel target drive force TcOUT), the inside wheel drive force provisional value tTcIN (inside wheel target drive force TcIN), and a drive force difference between these two values.

The outside wheel drive force provisional value tTcOUT (=TcLR/2+ΔTcLR/2) (step S15) and the inside wheel drive force provisional value tTcIN (=TcLR/2−ΔTcLR/2) (step S16) are calculated as shown in portion (c) of FIG. 5 based on the left-right even distribution amount TcLR/2(step S13) shown in portion (b) of FIG. 5 and the left-right even distribution amount ΔTcLR/2 of the rear wheel drive force difference ΔTcLR calculated in step S14 of FIG. 3.

In the example shown in FIG. 5, the control proceeds from step S21 to step S22 of FIG. 4 because the condition TcLR≥ΔTcLR exists as shown in portion (a) and, thus, the drive force difference ΔTcLR can be realized by setting a left-right distribution of the total drive force TcLR.

In the example shown in FIG. 5, step S24 is selected because the larger outside wheel drive force provisional value tTcOUT is not larger than the allowable upper limit value TcLimU (not shown in FIG. 5) (step S22) and the smaller inside wheel drive force provisional value tTcIN is not smaller than the allowable lower limit value TcLimL (not shown in FIG. 5) (step S23). Consequently, as shown in portion (c) of FIG. 5(c), the outside drive force provisional value tTcOUT is set as the outside wheel target drive force TcOUT without modification and the inside wheel drive force provisional value tTcIN is set as the inside wheel target drive force TcIN without modification.

After the outside wheel target drive force TcOUT and the inside wheel target drive force TcIN are set, the control proceeds to step S25 of FIG. 4 and determines if the vehicle is turning left or right based on the steering angle θ and the yaw rate Φ.

If the vehicle is turning left, then the control proceeds to step S26 and sets the inside wheel target drive force TcIN as the target drive force TcL for the left rear wheel (which is the rear wheel on the inside of the turn) and sets the outside wheel target drive force TcOUT as the target drive force TcR for the right rear wheel (which is the rear wheel on the outside of the turn). If the vehicle is turning right, then the control proceeds to step S27 and sets the outside wheel target drive force TcOUT as the target drive force TcL for the left rear wheel (which is the rear wheel on the outside of the turn) and sets the inside wheel target drive force TcIN as the target drive force TcR for the right rear wheel (which is the rear wheel on the inside of the turn).

The four-wheel drive controller 21 shown in FIG. 1 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR, respectively, set by the computing section 34 shown in FIG. 2 as explained previously.

Figure 6:
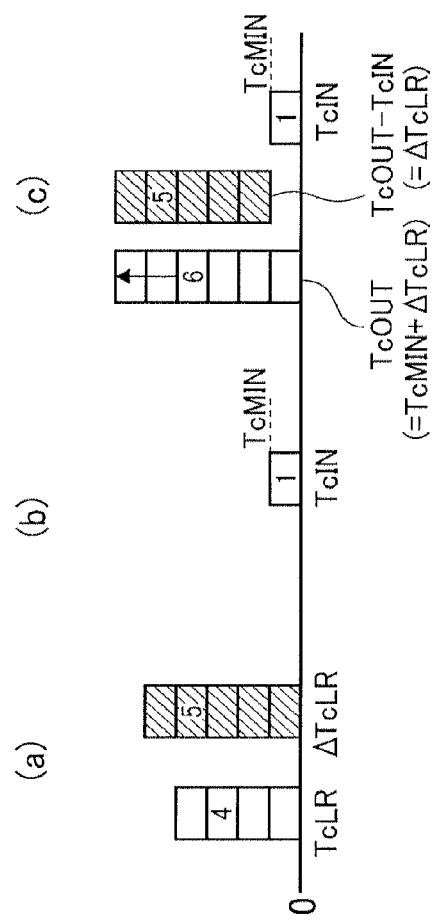
FIG. 6 illustrates how an outside wheel target drive force TcOUT and an inside wheel target drive force TcIN are determined before the left-right rear wheel target drive force computing section, which is shown in FIG. 2, computes left and right rear wheel target drive forces in a situation where a rear wheel total drive force TcLR is smaller than a rear wheel drive force difference ΔTcLR and neither an outside wheel drive force provisional value tTcOUT nor an inside wheel drive force provisional value tTcIN is at a limit value, in which portion (a) shows levels of a rear wheel total drive force TcLR and a rear wheel drive force difference ΔTcLR to be targeted, portion (b) shows an inside wheel target drive force, and portion (c) shows the outside wheel target drive force TcOUT, the inside wheel target drive force TcIN, and a drive force difference between these two values.

The control proceeds from step S21 of FIG. 4 to step S28 if the computing section 34 determines that the rear wheel total drive force TcLR is smaller than the rear wheel drive force difference ΔTcLR as shown in portion (a) of FIG. 6, i.e., if the inside wheel drive force provisional value tTcIN calculated in step S16 of FIG. 3 is negative and it will not be possible to realize the rear wheel drive force difference ΔTcLR by setting a left-right distribution of the rear wheel total drive force TcLR.

When the inside drive force provisional value tTcIN is a negative value, it means a drive force is not transmitted to the corresponding rear wheel located on the inside of the turn and the vehicle is in an unstable three-wheel drive state. In step S28, in order to prevent an unstable three-wheel drive state from occurring, a minimum initial drive force TcMIN shown in portion (b) of FIG. 6 is set as the inside wheel target drive force TcIN instead of setting the inside wheel drive force provisional value tTcIN as shown in step S24. The minimum initial drive force TcMIN is a minimum initial drive force necessary to prevent a three-wheel drive state. In step S28, instead of setting the outside wheel target drive force TcOUT to the rear wheel drive force provisional value tTcOUT as in step S24, the computing section 34 sets the outside wheel target drive force TcOUT to the sum value of the initial drive force TcMIN and the rear wheel drive force difference ΔTcLR as shown in portion (c) of FIG. 6. This sum value is a value with which the rear wheel drive force difference ΔTcLR can be achieved while the inside wheel target drive force TcIN is set to the initial drive force TcMIN.

After setting the outside wheel target drive force TcOUT and the inside wheel target drive force TcIN in the manner just explained, the computing section 34 executes the steps S25 to S27 of FIG. 4 to set the left rear wheel target drive force TcL and the right rear wheel target drive force TcR. Then, the four-wheel drive controller 21 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR, respectively.

If it determines that TcLR≥ΔTcLR in step S21 of FIG. 4 and that the outside wheel drive force provisional value tTcOUT exceeds the allowable upper limit value TcLimU in step S22, then the computing section 34 proceeds to step S29 where, instead of setting the outside wheel target drive force TcOUT to the outside wheel drive force provisional value tTcOUT as in step S24, the computing section 34 limits the outside wheel target drive force TcOUT to the allowable upper limit value TcLimU. Then, in step S30, instead of setting the inside wheel target drive force TcIN to the inside wheel drive force provisional value tTcIN as in step S24, the computing section 34 calculates the inside wheel target drive force TcIN based on the rear wheel total drive force TcLR and the outside wheel drive force provisional value tTcOUT set in step S29 using the equation TcIN=TcLR−TcOUT.

The processing steps executed until the outside wheel target drive force TcOUT and the inside wheel target drive force TcIN are set in step S29 as explained above will now be explained with reference to FIG. 7. Portion (a) of FIG. 7 shows the levels of the rear wheel total drive force TcLR and the rear wheel drive force difference ΔTcLR read in steps S11 and S12 of FIG. 3, and portion (b) of FIG. 7 shows the left-right even distribution amount TcLR/2 of the rear wheel total drive force TcLR (step S13).

Figure 7:
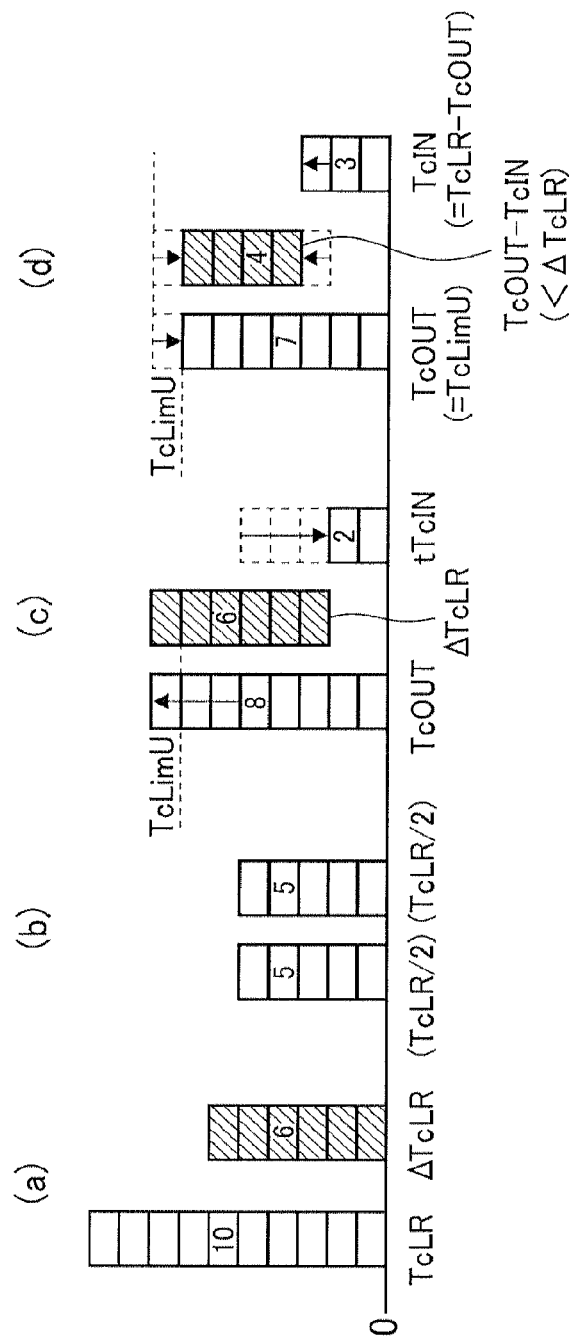
FIG. 7 illustrates how an outside wheel target drive force TcOUT and an inside wheel target drive force TcIN are determined before the left-right rear wheel target drive force computing section, which is shown in FIG. 2. computes left and right rear wheel target drive forces in a situation where a rear wheel total drive force TcLR is larger than a rear wheel drive force difference ΔTcLR and the outside wheel drive force provisional value tTcOUT is at an allowable upper limit value TcLimU, in which portion (a) shows levels of a rear wheel total drive force TcLR and a rear wheel drive force difference ΔTcLR to be targeted, portion (b) shows a left-right even distribution amount TcLR/2 for the rear wheel total drive force TcLR, portion (c) shows the outside wheel drive force provisional value tTcOUT, the inside wheel drive force provisional value tTcIN, and a drive force difference between these two values, and portion (d) shows the outside wheel target drive force TcOUT, the inside wheel target drive force TcIN, and a drive force difference between these two values.

The outside wheel drive force provisional value tTcOUT TcLR/2+ΔTcLR/2) (step S15) and the inside wheel drive force provisional value tTcIN (=TcLR/2−ΔTcLR/2) (step S16) are calculated as shown in portion (c) of FIG. 7 based on the left-right even distribution amount TcLR/2(step S13) shown in portion (b) of FIG. 7 and the left-right even distribution amount ΔTcLR/2 of the rear wheel drive force difference ΔTcLR calculated in step S14 of FIG. 3.

In the example shown in FIG. 7, the control proceeds from step S21 to step S22 of FIG. 4 because the condition TcLR≥ΔTcLR exists as shown in (a) and, thus, the drive force difference ΔTcLR can be realized by setting a left-right distribution of the total drive force TcLR, In the example shown in FIG. 7, steps S29 and S30 are selected sequentially because the larger outside wheel drive force provisional value tTcOUT is larger than the allowable upper limit value TcLimU as shown in portion (c) of FIG. 7 (step S22). Therefore, as shown in portion (d) of FIG. 7, the outside wheel target drive force TcOUT is limited to the allowable upper limit value TcLimU (step S29) and the inside wheel target drive force TcIN is calculated using the equation TcIN=TcLR−tTcOUT (step S30).

In step S31, the computing section 34 checks if the inside wheel target drive force TcIN calculated in step S30 is equal to or larger than the allowable lower limit value TcLimL. If it determines that the relationship TcIN≥TcLimL exits in step S31, then the computing section 34 proceeds to step S32 because the inside wheel target drive force TcIN does not need to be limited. In step S32, the computing section 34 sets the inside wheel target drive force TcIN to the value (TcIN=TcLR−tTcOUT) computed in step S30 and sets the outside wheel target drive force TcOUT to the limited value (TcOUT=TcLimU) computed in step S29.

If it determines that the relationship TcIN<TcLimL exits in step S31, then the computing section 34 proceeds to step S33 because the inside wheel target drive force TcIN is insufficient. In step S33, the computing section 34 increases the inside wheel target drive force TcIN according to TcIN=TcLimL instead of setting it to the value (TcIN=TcLR−tTcOUT) computed in step S30 and sets the outside wheel target drive force TcOUT to the limited value (TcOUT=TcLimU) computed in step S29.

After setting the outside wheel target drive force TcOUT and the inside wheel target drive force TcIN in the manner just explained, the computing section 34 executes the steps S25 to S27 of FIG. 4 to set the left rear wheel target drive force TcL and the right rear wheel target drive force TcR. Then, the four-wheel drive controller 21 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR, respectively.

If it determines that TcLR≥ΔTcLR in step S21 of FIG. 4, that the outside wheel drive force provisional value tTcOUT does not exceed the allowable upper limit value TcLimU in step S22, and that the inside wheel drive force provisional value tTcIN does not exceed the allowable lower limit value TcLimL, then the computing section 34 proceeds to step S34 where, instead of setting the inside wheel target drive force TcIN to the inside wheel drive force provisional value tTcIN as in step S24, the computing section 34 raises the inside wheel target drive force TcIN to the limit value TcLimL (TcIN=TcLimL). Then, in step S35, instead of setting the outside wheel target drive force TcOUT to the outside wheel drive force provisional value tTcOUT as in step S24, the computing section 34 calculates the outside wheel target drive force TcOUT by adding the rear wheel drive force difference ΔTcLR to the inside wheel target drive force TcIN set in step S34 (TcOUT=TcIN+ΔTcLR).

The processing steps executed until the outside wheel target drive force TcOUT and the inside wheel target drive force TcIN are set in steps S34 and S35 as explained above will now be explained with reference to FIG. 8. Portion (a) of FIG. 8 shows the levels of the rear wheel total drive force TcLR and the rear wheel drive force difference ΔTcLR read in steps S11 and S12 of FIG. 3, and portion (b) of FIG. 8 shows the left-right even distribution amount TcLR/2 of the rear wheel total drive force TcLR (step S13).

Figure 8:
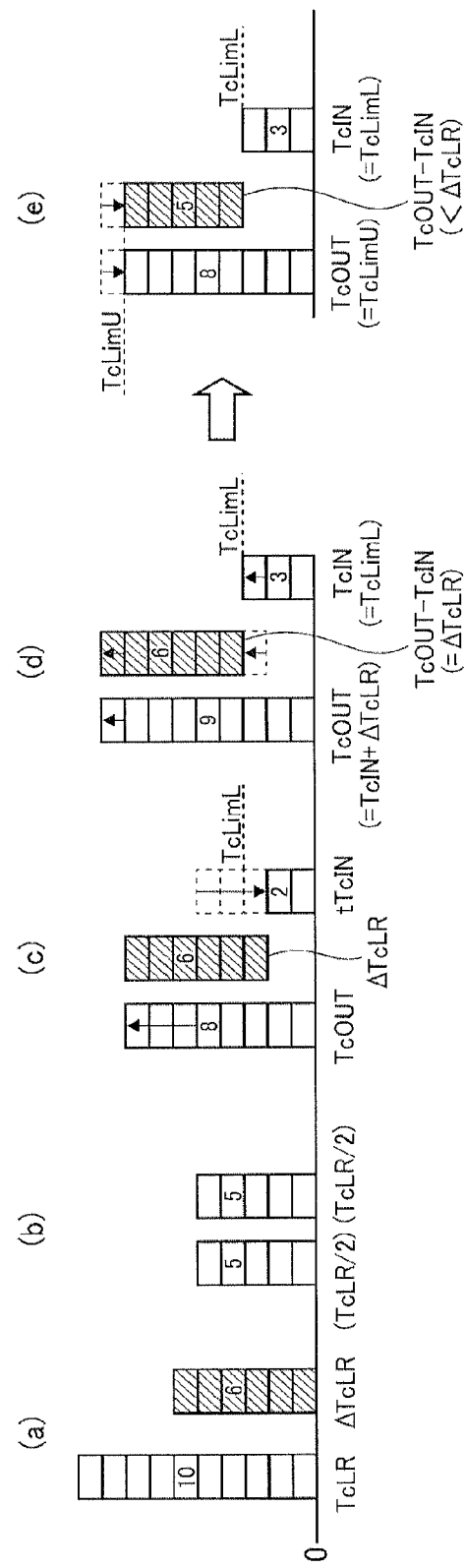
FIG. 8 illustrates how an outside wheel target drive force TcOUT and an inside wheel target drive force TcIN are determined before the left-right rear wheel target drive force computing section, which is shown in FIG. 2, computes left and right rear wheel target drive forces in a situation where a rear wheel total drive force TcLR is larger than a rear wheel drive force difference ΔTcLR and the inside wheel drive force provisional value tTcIN is at an allowable lower limit value TcLimL, in which portion (a) shows levels of a rear wheel total drive force TcLR and a rear wheel drive force difference ΔTcLR to be targeted, portion (b) shows a left-right even distribution amount TcLR/2 for the rear wheel total drive force TcLR, portion (c) shows the outside wheel drive force provisional value tTcOUT, the inside wheel drive force provisional value tTcIN, and a drive force difference between these two values, portion (d) shows the outside wheel target drive force TcOUT, the inside wheel target drive force TcIN, and a drive force difference between these two values, and portion (e) shows the outside wheel target drive force TcOUT, the inside wheel target drive force TcIN, and a drive force difference between these two values for a situation in which the outside wheel target drive force TcOUT is at the allowable upper limit value TcLimU.

The outside wheel drive force provisional value tTcOUT (=TcLR/2+ΔTcLR/2) (step S15) and the inside wheel drive force provisional value tTcIN (=TcLR/2−ΔTcLR/2) (step S16) are calculated as shown in portion (c) of FIG. 8 based on the left-right even distribution amount TcLR/2 (step S13) shown in portion (b) of FIG. 8 and the left-right even distribution amount ΔTcLR/2 of the rear wheel drive force difference ΔTcLR calculated in step S14 of FIG. 3.

In the example shown in FIG. 8, the control proceeds from step S21 to step S22 of FIG. 4 because the condition TcLR≥ΔTcLR exists as shown in (a) and, thus, the drive force difference ΔTcLR can be realized by setting a left-right distribution of the total drive force TcLR, In the example shown in FIG. 8, steps S34 and S35 are selected sequentially because the smaller inside wheel drive force provisional value tTcIN is smaller than the allowable lower limit value TcLimL as shown in portion (c) of FIG. 8 (step S23). Therefore, as shown in portion (d) of FIG. 8, the inside wheel target drive force TcIN is increased to the allowable lower limit value TcLimL (TcIN=TcLimL) (step S34) and the outside wheel target drive force TcOUT is calculated using the equation TcOUT=TcOUT−ΔTcLR (step S35).

After setting the inside wheel target drive force TcIN and the outside wheel target drive force TcOUT, the computing section 34 proceeds to step S36 and checks if the outside wheel target drive force TcOUT calculated in step S35 is larger than the allowable upper limit value TcLimU as shown in portion (e) of FIG. 8.

If it determines that TcOUT>TcLimU in step S36, then the computing section proceeds to step S37 because the outside wheel target drive force TcOUT is larger than the allowable upper limit value TcLimU as shown in portion (e) of FIG. 8. In step S37, instead of setting the outside wheel target drive force TcOUT according to the equation TcOUT=TcOUT+ΔTcLR as in step S35, the computing section 34 limits the outside wheel target drive force TcOUT to the allowable upper limit value TcLimU (TcOUT=TcLimU) as shown in portion (e) of FIG. 8 and sets the inside wheel target drive force TcIN to the same value as was set in step S34 (TcIN=TcLimL). If it determines that TcOUT≤TcLimU in step S36, then the computing section 34 proceeds to step S38 because it is not necessary to limit the outside wheel target drive force TcOUT. In step S38, the computing section 34 sets the outside wheel target drive force TcOUT to the same value as was computed in step S35 (TcOUT=TcOUT+ΔTcLR) and sets the inside wheel target drive force TcIN to the same value as was set in step S34 (TcIN=TcLimL).

After setting the outside wheel target drive force TcOUT and the inside wheel target drive force TcIN in the manner just explained, the computing section 34 executes the steps S25 to S27 of FIG. 4 to set the left rear wheel target drive force TcL and the right rear wheel target drive force TcR. Then, the four-wheel drive controller 21 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR, respectively.

Effects that are obtained with a four-wheel drive vehicle drive force distribution control according to the embodiment explained heretofore will now be explained. If the rear wheel total drive force TcLR is smaller than the rear wheel drive force difference ΔTcLR as shown in portion (a) of FIG. 6

(step S21), i.e., if the inside wheel drive force provisional value tTcIN calculated in step S16 of FIG. 3 is negative and the rear wheel drive force difference ΔTcLR cannot be realized by setting a left-right distribution of the rear wheel total drive force TcLR, then the loop including step S28 in FIG. 4 is selected and, as explained previously with reference to portions (b) and (c) of FIG. 6, the inside wheel target drive force TcIN is set to a minimum initial drive force TcMIN required to prevent a three-wheel drive state from occurring (step S28) instead of setting the inside wheel target drive force TcIN to the inside wheel drive force provisional value tTcIN (which is a negative value as explained previously) (step S24). The outside target drive force TcOUT is set to the sum of the initial drive force TcMIN and the rear wheel drive force difference ΔTcLR (step S28), which is a value that enables the rear wheel drive force difference ΔTcLR to be realized while the inside wheel target drive force TcIN is set to the initial drive force TcMIN. Consequently, the inside wheel target drive force TcIN and the outside wheel target drive force TcOUT are set such that priority is given to achieving the rear wheel drive force difference ΔTcLR over achieving the rear wheel total drive force TcLR and the set target drive forces TcIN and TcOUT are used to control the holding forces of the clutches 11L and 11R (steps S25 to S27).

If TcLR<ΔTcLR as shown in portion (a) of FIG. 6, then it would normally be impossible to realize the rear wheel drive force difference ΔTcLR. However, with this embodiment, the rear wheel drive force difference ΔTcLR can be realized as shown in portion (c) of FIG. 6 and the requested vehicle turning behavior can be obtained in accordance with the rear wheel drive force difference ΔTcLR.

Furthermore, with this embodiment, additional effects can be obtained because the previously explained effects are achieved while setting the inside wheel target drive force TcIN to the minimum initial drive force TcMIN necessary to prevent a three-wheel drive state from occurring.

In particular, when TcLR<ΔTcLR as shown in portion (a) of FIG. 6, the inside wheel drive force provisional value tTcIN found in step S16 of FIG. 3 is negative. If this inside wheel drive force provisional value tTcIN is set as the inside wheel target drive force TcIN, then a drive force will not be transmitted to the corresponding rear wheel and the vehicle will enter an unstable three-wheel drive state. Instead of setting the inside wheel target drive force TcIN to the inside wheel drive force provisional value tTcIN (as in step S24), the controller in this embodiment sets the inside wheel target drive force TcIN to the minimum initial drive force TcMIN necessary to prevent a three-wheel drive state from occurring (step S28). As a result, the vehicle can be prevented from entering an unstable three-wheel drive state, which is very advantageous from a safety perspective. (2) When the rear wheel total drive force TcLR is equal to or larger than the rear wheel drive force difference ΔTcLR as shown in portion (a) of FIG. 7 (step S21), i.e., the rear wheel drive difference ΔTcLR can be realized by setting a left-right distribution of the rear wheel total drive force TcLR, and the outside wheel drive force provisional value tTcOUT is larger than the allowable upper limit value TcLimU as shown in portion (c) of FIG. 7 (step S22), the controller limits the outside target drive force TcOUT to the allowable upper limit value TcLimU as shown in portion (c) of FIG. 7 (step S29) instead of setting the outside target drive force TcOUT to the outside wheel drive force provisional value tTcOUT (step S24). Also, instead of setting the inside wheel target drive force TcIN to the inside wheel drive force provisional value tTcIN (step S24), the controller sets the inside wheel target drive force TcIN to a value calculated based on the rear wheel total drive force TcLR and the outside wheel drive force provisional value tTcOUT using the equation TcIN=TcLR−tTcOUT (step S30) as shown in portion (c) of FIG. 7. Thus, although the targeted rear wheel drive force difference ΔTcLR cannot be realized, the target rear wheel total drive force TcLR can be secured. As a result, the desired four-wheel drive drivability can be obtained and the desired stability can be obtained because drive slippage of the left and right front wheels 1L and 1R (rotational speed difference between front and rear wheels) can be resolved to zero when it occurs.

(3) When the rear wheel total drive force TcLR is equal to or larger than the rear wheel drive force difference ΔTcLR as shown in portion (a) of FIG. 8 (step S21), i.e., the rear wheel drive difference ΔTcLR can be realized by setting a left-right distribution of the rear wheel total drive force TcLR, and the inside wheel drive force provisional value tTcIN is smaller than the allowable lower limit value TcLimL as shown in portion (c) of FIG. 8 (step S23), the controller raises the outside target drive force TcIN to the allowable lower limit value TcLimL (TcIN=TcLimL) as shown in portion (c) of FIG. 8 (step S34) instead of setting the inside target drive force TcIN to the inside wheel drive force provisional value tTcIN (step S24). Also, instead of setting the outside wheel target drive force TcOUT to the outside wheel drive force provisional value tTcOUT (step S24), the controller sets the outside wheel target drive force TcOUT to a value calculated by adding the inside wheel target drive force TcIN and the rear wheel drive force difference ΔTcLR together using the equation TcOUT=TcIN+ΔTcLR (step S35) as shown in portion (d) of FIG. 8. As shown in portion (d) of FIG. 8, although a drive force larger than the targeted rear wheel total drive force TcLR will be delivered to the left and right rear wheels, the targeted rear wheel drive force difference ΔTcLR can be realized and the requested vehicle turning behavior can be obtained in accordance with the rear wheel drive force difference ΔTcLR.

(4) If the outside wheel target drive force TcOUT resulting after the inside wheel target drive force TcIN and the outside wheel target drive force TcOUT have been set as shown in portion (d) of FIG. 8 will be larger than the allowable upper limit value TcLimU shown in portion (e) of FIG. 8, then the controller limits the outside wheel target drive force TcOUT to the allowable upper limit value TcLimU (TcOUT=TcLimU) (step S37) instead of setting the outside wheel target drive force TcOUT according to the equation TcOUT=TcOUT+ΔTcLR as shown in portion (d) of FIG. 8. Meanwhile, the controller sets the inside wheel target drive force TcIN according to TcIN=TcLimL as shown in portion (d) of FIG. 8 (step S37). As a result, even though the outside wheel target drive force TcOUT larger than the allowable upper limit value TcLimU cannot be realized, the pointless continuation of the holding force control of the clutches 11L and 11R based on the excessive outside wheel target drive force TcOUT can be avoided.

Other Embodiments

In a four-wheel drive vehicle equipped with a vehicle dynamics control (VDC) that controls behavior of the vehicle based on a brake force difference between left and right wheels, a traction control system (TCS) that prevents drive slippage of a wheel by braking the wheel, and an anti-skid control system (ABS) that prevents braking-induced wheel slippage by adjusting a wheel brake force, measures can be taken to prevent the four-wheel drive control explained heretofore from affecting these systems.

Specifically, during operation of the VDC, TCS, and ABS, the previously explained four-wheel drive control (front-rear wheel drive force distribution control and left-right wheel drive force distribution control) should be stopped and the front-rear wheel drive force distribution or the left-right wheel drive force distribution control should be fixed at an even distribution, or the left-right wheel drive force distribution should be fixed at an even distribution (TcL=TcR) without exceeding a rear wheel total drive force TcLR instructed by the VDC, TCS, and ABS.

In this way, the VDC, the TCS, and the ABS can always recognize the left and right rear wheel drive forces instructed by the rear-wheel drive control and execute their controls as originally intended while taking the recognized left and right rear-wheel drive forces into account. As a result, a situation in which the control executed by the VDC, the TCS, and the ABS and the four-wheel drive control affect each other and diverge from each other can be prevented.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

The invention claimed is:

1. A four-wheel drive vehicle drive force distribution control apparatus comprising:
a controller programmed to include
a target value setting section that sets, based on a vehicle operating state, a target value of a total drive force to be delivered to a left subordinate drive wheel and a right subordinate drive wheel, and that sets a target value of a left-right drive force difference between the drive forces of the left subordinate drive wheel and the right subordinate drive wheel;
a friction element holding force control section that controls holding forces of a left subordinate drive wheel friction element and right subordinate drive wheel friction element such that a total drive force matches the target value for the total drive force set by the target value setting section and the left-right drive force difference matches the target value for the left-right drive force difference set by the controller target value setting section; and
a drive force comparing section that compares the sizes of the target value of the total drive force and the target value of the left-right drive force difference,
the controller being further programmed such that during a period while the drive force comparing section determines that the target value of the left-right drive force difference is larger than the target value of the total drive force, the friction element holding force control section controls the holding forces of the left subordinate drive wheel friction element and the right subordinate drive wheel friction element such that priority is given to achieving the target value of the left-right drive wheel difference over achieving the target value of the total drive force.

2. The four-wheel drive vehicle drive force distribution control apparatus according to claim 1, wherein
the controller is further programmed such that during a period while the drive force comparing section determines that the target value of the total drive force is larger than the target value of the left-right drive force difference, the friction element holding force control section selects a drive force provisional value for the left subordinate drive wheel and a drive force provisional value for the right subordinate drive wheel that can achieve both the target value of the total drive force and the target value of the left-right drive force difference, and
the controller is further programmed such that the friction element holding force control section upon determining that one of the drive force provisional values is larger than an allowable upper limit value, the friction element holding force section then decreases the one of the drive force provisional value to the allowable upper limit value before using the one of the drive force provisional value to control the holding force of the friction element on a corresponding side and increases the other of the drive force provisional value by an amount equal to the amount by which the one of the drive force provisional value was decreased before using the other of the drive force provisional value to control the holding force of the friction element on a corresponding side.

3. The four-wheel drive vehicle drive force distribution control apparatus according to claim 2, wherein
the controller is further programmed such that during the that the target value of the total drive force is larger than the target value of the left-right drive force difference, the friction element holding force control section upon determining that one of the drive force provisional values is smaller than an allowable lower limit value, the friction element holding force control section then increases the one of the drive force provisional value to the allowable lower limit value before using the one of the drive force provisional value to control the holding force of the friction element on the corresponding side and increases the other of the drive force provisional value by an amount equal to the amount by which the one of the drive force provisional value was increased before using the other of the drive force provisional value to control the holding force of the friction element on the corresponding side.

4. The four-wheel drive vehicle drive force distribution control apparatus according to claim 3, wherein
the controller is further programmed such that during the that the target value of the total drive force is larger than the target value of the left-right drive force difference, the friction element holding force control section decreases the other of the drive force provisional value to the allowable upper limit before using the other of the drive force provisional value to control the holding force of the friction element on the corresponding side, upon the drive force comparing section determining that the other of the drive force provisional value exceeds the allowable upper limit after the other of the drive force provisional value has been increased by an amount equal to the amount by which the one of the drive force provisional value was increased.

5. The four-wheel drive vehicle drive force distribution control apparatus according to claim 1, wherein
the controller is further programmed such that during a period while the drive force comparing section determines that the target value of the total drive force is larger than the target value of the left-right drive force difference, the friction element holding force control section selects a drive force provisional value for the left subordinate drive wheel and a drive force provisional value for the right subordinate drive wheel that can achieve both the target value of the total drive force and the target value of the left-right drive force difference, and the controller is further programmed such that the friction element holding force control section upon determining that one of the drive force provisional values is smaller than an allowable lower limit value, the friction element holding force control section then increases the one of the drive force provisional value to the allowable lower limit value before using the one of the drive force provisional value to control the holding force of the friction element on the corresponding side and increases the other of the drive force provisional value by an amount equal to the amount by which the one of the drive force provisional value was increased before using the other of the drive force provisional value to control the holding force of the friction element on the corresponding side.

6. The four-wheel drive vehicle drive force distribution control apparatus according to claim 5, wherein the controller is further programmed such that the friction element holding force control section decreases the other of the drive force provisional value to the allowable upper limit before using the other of the drive force provisional value to control the holding force of the friction element on the corresponding side, upon the friction element holding force control section determining that the other of the drive force provisional value exceeds the allowable upper limit after the other of the drive force provisional value has been increased by an amount equal to the amount by which the one of the drive force provisional value was increased.

\* \* \* \* \*